US012687132B1

(12) United States Patent
Abedinpour Fallah et al.

(10) Patent No.: US 12,687,132 B1
(45) Date of Patent: Jul. 21, 2026

(54) CONTROL SYSTEM AND METHOD FOR POWERING A LOW INERTIA GENERATOR WITH A GAS TURBINE ENGINE AND MAINTAINING SPEED GOVERNING TOLERANCE

(71) Applicant: Pratt & Whitney Canada Corp., Longueuil (CA)

(72) Inventors: Mehdi Abedinpour Fallah, Longueuil (CA); Poi Loon Tang, Coquitlam (CA); Richard Freer, Mont-Sainte-Hilaire (CA); Sylvain Lamarre, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1 day.

(21) Appl. No.: 19/088,650

(22) Filed: Mar. 24, 2025

(51) Int. Cl.
 *F02C 9/28* (2006.01)

(52) U.S. Cl.
 CPC ............ *F02C 9/28* (2013.01); *F05D 2220/76* (2013.01); *F05D 2270/02* (2013.01)

(58) Field of Classification Search
 CPC .................. F02C 9/56; F02C 9/48; F02C 9/28
 See application file for complete search history.

(56) References Cited

U.S. PATENT DOCUMENTS

| | | | | |
|---|---|---|---|---|
| 5,761,895 | A | * | 6/1998 | Chu ........................... F02C 9/28 |
| | | | | 60/773 |
| 7,188,475 | B2 | | 3/2007 | McGinley et al. |

| | | | | |
|---|---|---|---|---|
| 9,494,085 | B2 | | 11/2016 | Cai |
| 9,765,640 | B2 | | 9/2017 | Smith |
| 10,480,421 | B2 | | 11/2019 | Meunier et al. |
| 10,870,494 | B2 | | 12/2020 | Mestler et al. |
| 11,015,480 | B2 | | 5/2021 | Waun |
| 11,597,526 | B2 | | 3/2023 | Mark et al. |
| 11,794,917 | B2 | | 10/2023 | Guerchkovitch et al. |
| 11,840,350 | B2 | | 12/2023 | Rapin et al. |
| 11,873,110 | B2 | | 1/2024 | Hon et al. |
| 12,031,479 | B2 | | 7/2024 | Hiett et al. |
| 2003/0094001 | A1 | * | 5/2003 | Desai ........................ G05B 5/01 |
| | | | | 60/791 |
| 2012/0174559 | A1 | * | 7/2012 | Ling .......................... F02C 9/26 |
| | | | | 60/761 |
| 2017/0081974 | A1 | * | 3/2017 | Xiong ........................ F02C 9/46 |
| 2018/0222597 | A1 | * | 8/2018 | Covington .............. B64C 27/04 |
| 2018/0371936 | A1 | * | 12/2018 | Price .................... G05B 13/026 |
| 2021/0017914 | A1 | * | 1/2021 | Turner ...................... F02C 7/36 |
| 2021/0025338 | A1 | * | 1/2021 | Des Roches-Dionne .................... B64D 31/06 |

(Continued)

FOREIGN PATENT DOCUMENTS

| | | | |
|---|---|---|---|
| EP | 4334582 | B1 | 1/2025 |
| JP | 2022145067 | A | 10/2022 |

*Primary Examiner* — Phutthiwat Wongwian
*Assistant Examiner* — Jacek Lisowski

(57) ABSTRACT

A method may include receiving a generator power demand (GPD) signal for a gas generator of a gas turbine engine (GTE). The method may also include applying a smoothing filter to the GPD signal to create a smoothed GPD signal. The method may also include determining, using the smoothed GPD signal, a GPD anticipation parameter for controlling fuel flow rate to the GTE. The method may also include outputting a fuel flow rate request to the GTE based on the GPD anticipation parameter and a power turbine speed (NPT) controlled by an NPT governing feedback loop.

20 Claims, 5 Drawing Sheets

(56) References Cited

U.S. PATENT DOCUMENTS

| | | |
|---|---|---|
| 2021/0131355 A1 | 5/2021 | Szarvasy et al. |
| 2024/0229727 A1 | 7/2024 | Kai |

* cited by examiner

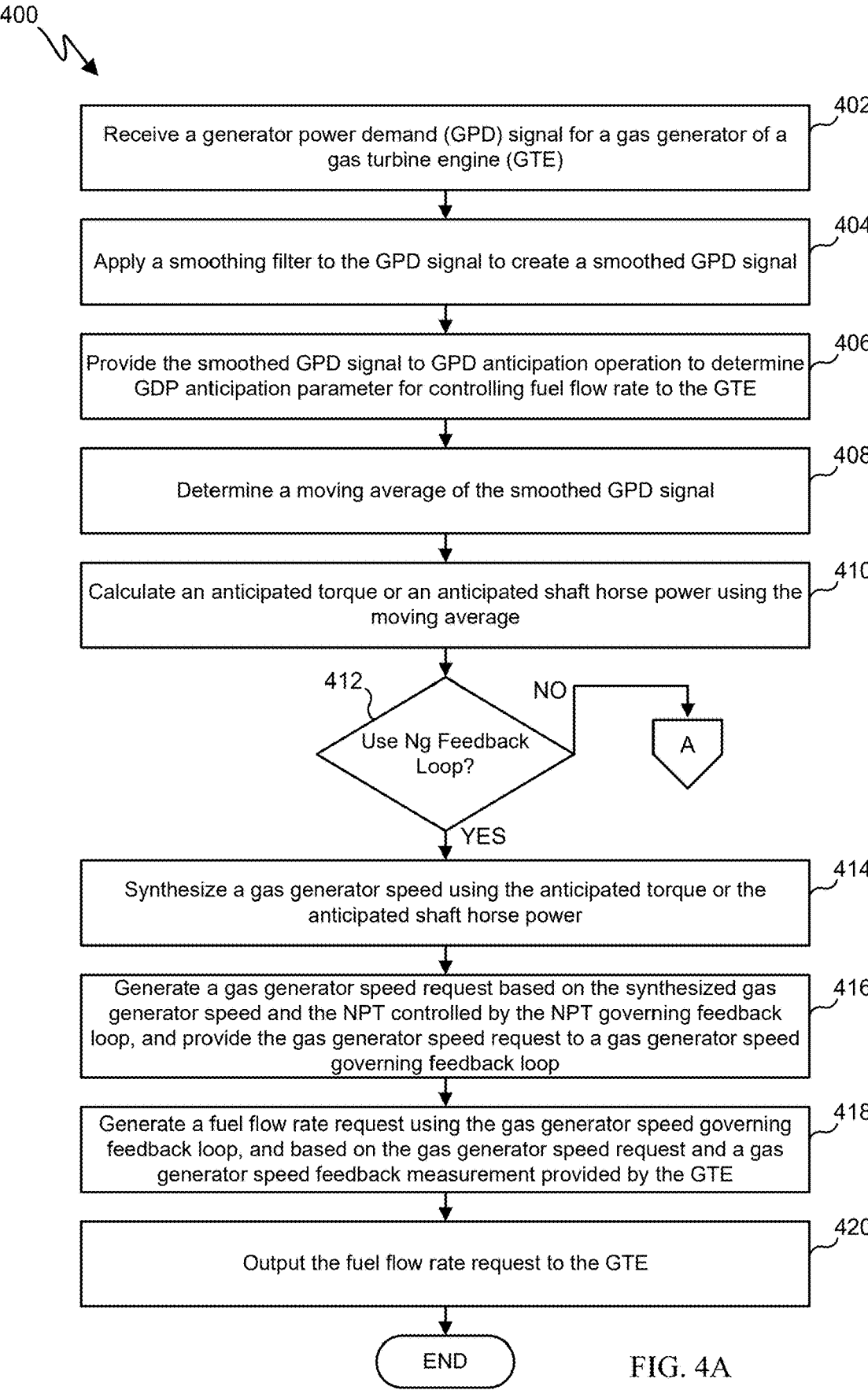

400

402
Receive a generator power demand (GPD) signal for a gas generator of a gas turbine engine (GTE)

404
Apply a smoothing filter to the GPD signal to create a smoothed GPD signal

406
Provide the smoothed GPD signal to GPD anticipation operation to determine GDP anticipation parameter for controlling fuel flow rate to the GTE 408
Determine a moving average of the smoothed GPD signal 410
Calculate an anticipated torque or an anticipated shaft horse power using the moving average 412
Use Ng Feedback Loop?

NO → A

YES

414
Synthesize a gas generator speed using the anticipated torque or the anticipated shaft horse power 416
Generate a gas generator speed request based on the synthesized gas generator speed and the NPT controlled by the NPT governing feedback loop, and provide the gas generator speed request to a gas generator speed governing feedback loop 418
Generate a fuel flow rate request using the gas generator speed governing feedback loop, and based on the gas generator speed request and a gas generator speed feedback measurement provided by the GTE 420
Output the fuel flow rate request to the GTE

END

FIG. 4A

CONTROL SYSTEM AND METHOD FOR POWERING A LOW INERTIA GENERATOR WITH A GAS TURBINE ENGINE AND MAINTAINING SPEED GOVERNING TOLERANCE

TECHNICAL FIELD

This disclosure generally relates to gas turbine engines. More specifically, this disclosure relates to control systems and methods for powering a low inertia generator with a gas turbine engine and maintaining speed governing tolerance.

BACKGROUND

In power generation systems where a generator is driven by a gas turbine engine (GTE), maintaining precise control over the turbine's speed and the generator's power output is critical for system performance. Speed governing tolerances must be maintained within a narrow range to ensure efficient operation of the generator, even under varying load conditions. The ability to smooth power demand signals during increasing power phases and decreasing power phases helps to ensure that the power output from the GTE matches the changes in electrical load without violating speed tolerance requirements. Meeting the speed governing tolerance during load transitions involves challenges related to smoothing power demand signals, transport delay, and filter design.

SUMMARY

This disclosure relates to control systems and methods for powering a low inertia generator with a gas turbine engine and maintaining speed governing tolerance.

In some examples, a method may include receiving a generator power demand (GPD) signal for a gas generator of a gas turbine engine (GTE). The method may also include applying a smoothing filter to the GPD signal to create a smoothed GPD signal. The method may also include determining, using the smoothed GPD signal, a GPD anticipation parameter for controlling fuel flow rate to the GTE. The method may also include outputting a fuel flow rate request to the GTE based on the GPD anticipation parameter and a power turbine speed (NPT) controlled by an NPT governing feedback loop.

In other examples, a system may include at least one controller configured to receive a generator power demand (GPD) signal for a gas generator of a gas turbine engine (GTE). The at least one controller may also be configured to apply a smoothing filter to the GPD signal to create a smoothed GPD signal. The at least one controller may also be configured to determine, using the smoothed GPD signal, a GPD anticipation parameter for controlling fuel flow rate to the GTE. The at least one controller may also be configured to output a fuel flow rate request to the GTE based on the GPD anticipation parameter and a power turbine speed (NPT) controlled by an NPT governing feedback loop.

In in still other examples, a non-transitory machine readable medium includes instructions that when executed cause at least one processor to receive a generator power demand (GPD) signal for a gas generator of a gas turbine engine (GTE), apply a smoothing filter to the GPD signal to create a smoothed GPD signal, determine, using the smoothed GPD signal, a GPD anticipation parameter for controlling fuel flow rate to the GTE, and output a fuel flow rate request to the GTE based on the GPD anticipation parameter and a power turbine speed (NPT) controlled by an NPT governing feedback loop.

Any single one or any combination of the following features may be used with the examples above. The smoothed GPD signal may be transmitted to a generator according to a delay based on a rate of change of the smoothed GPD signal. The transmission of the smoothed GPD signal to the generator according to the delay based on the rate of change of the smoothed GPD signal may include controlling the delay based on a rate of increase or a rate of decrease of the GPD. Applying the smoothing filter may also apply a rate limiter to the GPD signal. To determine the GPD anticipation parameter, a moving average of the smoothed GPD signal can be determined, and an anticipated torque or an anticipated shaft horse power can be calculated using the moving average. To determine the GPD anticipation parameter, a gas generator speed can be synthesized using the anticipated torque or the anticipated shaft horse power. A gas generator speed request can be generated based on the synthesized gas generator speed and the NPT controlled by the NPT governing feedback loop. The gas generator speed request can be provided to a gas generator speed governing feedback loop. The gas generator speed governing feedback loop can be disposed as an inner control loop within the NPT governing feedback loop. The fuel flow rate request can be generated using the gas generator speed governing feedback loop, and based on the gas generator speed request and a gas generator speed feedback measurement provided by the GTE. A torque request can be generated based on the anticipated torque and the NPT controlled by the NPT governing feedback loop. The torque request can be provided to a torque governing feedback loop. The torque governing feedback loop can be disposed as an inner control loop within the NPT governing feedback loop. The fuel flow rate request can be generated using the torque governing feedback loop, and based on the torque request and a torque feedback measurement provided by the GTE. To determine the GPD anticipation parameter, a fuel flow rate can be synthesized using the anticipated torque or the anticipated shaft horse power. The fuel flow rate request can be generated based on the synthesized fuel flow rate and the NPT controlled by the NPT governing feedback loop.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 4A and 4B illustrate an example method for powering a generator with a gas turbine engine and maintaining speed governing tolerance in accordance with this disclosure.

DETAILED DESCRIPTION

FIGS. 1 through 4B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As stated above, in power generation systems where a generator is driven by a gas turbine engine (GTE), maintaining precise control over the turbine's speed and the generator's power output is critical for system performance. Speed governing tolerances must be maintained within a narrow range to ensure efficient operation of the generator, even under varying load conditions. The ability to smooth power demand signals during increasing power phases and decreasing power phases helps to ensure that the power output from the GTE matches the changes in electrical load without violating speed tolerance requirements. Meeting the speed governing tolerance during load transitions involves challenges related to smoothing power demand signals, transport delay, and filter design.

This disclosure provides control systems and methods to enhance power demand smoothing, maintain accurate speed tracking, and optimize fuel flow control using anticipation of changes in power demand. Specifically, this disclosure relates to power generation systems and, more specifically, to control systems and methods for regulating the power output from a low inertia generator powered by an aircraft GTE and maintaining GTE speed governing tolerance when demand for electrical power increases and decreases. Embodiments of this disclosure can include a generator power demand (GPD) signal flow structure, a smoothing mechanism for the GPD, and a series of control loops to manage GTE speed and fuel flow. By smoothing the signal, anticipating fuel flow adjustments, and using the control loops, the system ensures that the power turbine speed (NPT) of the GTE stays within the required tolerance during varying load conditions, to optimize system performance and efficiency.

As described in this disclosure, the control systems and various control loop structures can incorporate a programmable delay unit, which manages a programmable delay to the smoothed GPD signals transmitted to the generator based on a negative or positive sign of the rate of change of the smoothed GPD. Additionally, in various embodiments, the control systems and various control loop structures can use different parameters for governing operation of the aircraft. For example, in some embodiments, an inner loop of the control system's control loop can be a gas generator speed (Ng) governing inner loop. In some embodiments, an inner loop of the control system's control loop can be a torque (Q) governing inner loop. In some embodiments, there may be no inner loop, and instead the control system structure uses fuel flow control directly.

Figure 1:
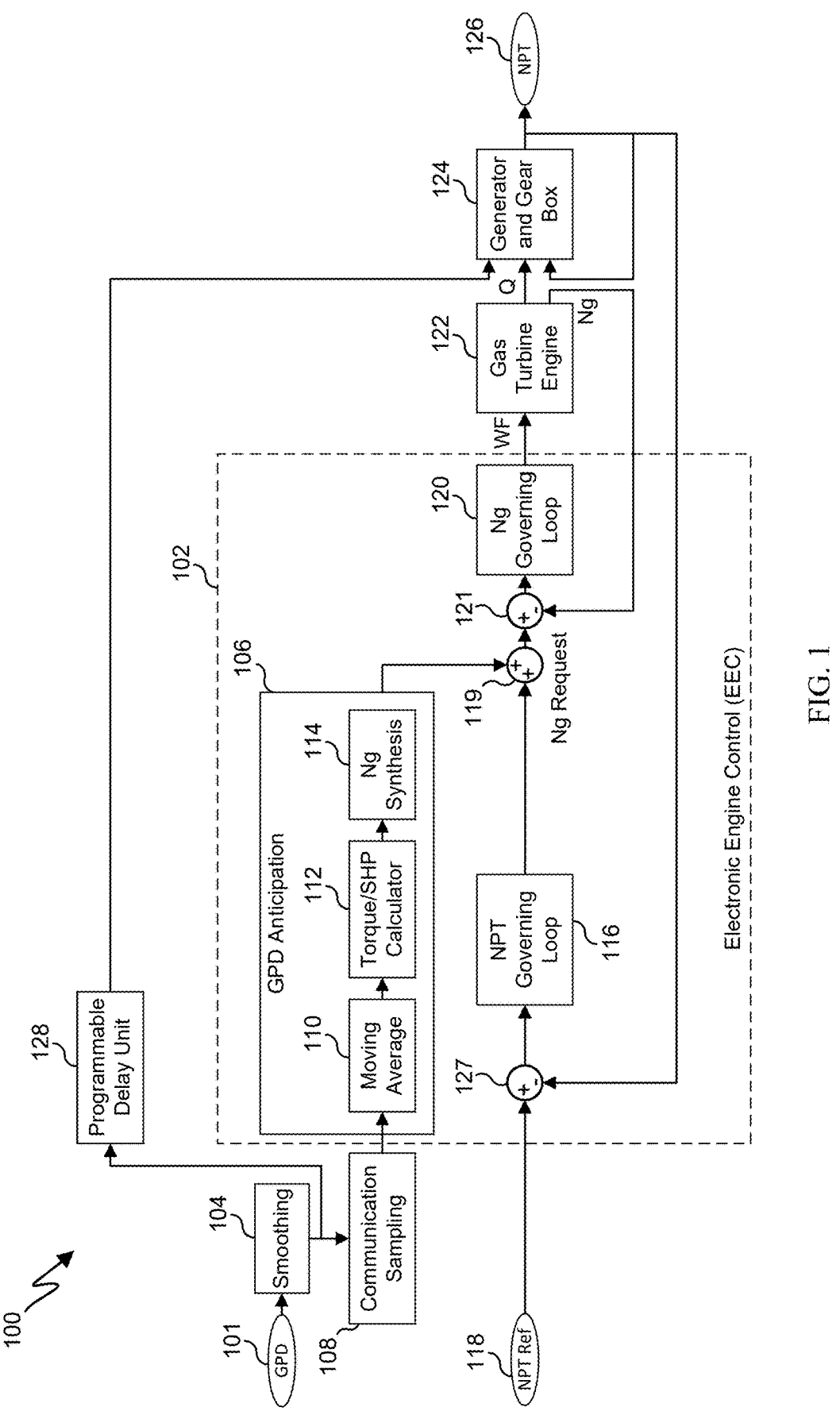
FIG. 1 illustrates an example control system including a gas generator speed governing inner loop in accordance with this disclosure.

FIG. 1 illustrates an example control system 100 including an Ng governing inner loop in accordance with this disclosure. In various embodiments, the control loop structures shown in FIG. 1 can be implemented in an electronic engine controller (EEC) 102 of an aircraft.

As shown in FIG. 1, a GPD signal 101 is set in an external computer/device and is processed to ensure smooth transitions in power demand during flight phases with varying load. The GPD signal 101 is processed by a GPD signal smoothing operation 104. The smoothing operation 104 can include a rate limiter that can be combined with a smoothing filter such as a low-pass filter of any order, or multiple cascaded spline filters with variable coefficients (which are based on a function of altitude and ambient temperature) to smooth the GPD signal 101 over time. The smoothing operation 104 can also optionally be variable as a function of a GPD increase or decrease with a possible switching mechanism based on a negative or positive rate of the change of the GPD. The smoothed GPD is then transmitted to various system components.

For example, as shown in FIG. 1, a GPD anticipation operation 106 is performed to maintain speed tracking accuracy, and to adjust the fuel flow ahead of (i.e., in anticipation of) changes in power demand, which reduces tracking errors. The smoothed GPD signal will be used in the EEC as an anticipation term to command an Ng reference to increase or decrease a fuel flow request in advance of an NPT tracking error to better align the GTE power output to changes in generator load. Communication sampling 108 can also be performed prior to performing the GPD anticipation 106.

In various embodiments of this disclosure, the GPD anticipation operation 106 can include using a moving average 110. The moving average 110 can be an m-cycle moving average. That is, to reduce choppiness in fuel flow signal due to a lower GPD communication sampling rate relative to an EEC rate, an m-cycle moving average can be applied to the GPD signal. The moving average 110 can be computed using the last m values of the GPD signal to smooth out fluctuations and provide a more stable input for the subsequent control mechanisms. The moving average 110 can be represented, for example, as follows.

$$GPD_{avg}^m[n] = \frac{1}{m}\sum_{i=0}^{m-1} GPD[n-i]$$

The GPD anticipation operation 106 can also include a torque/SHP calculator 112. The smoothed moving average $$\left(GPD_{avg}^m\right)$$

signal is fed into the calculator 112 to compute the necessary torque (Q) for gas generator speed (Ng) synthesis or WF synthesis logics. For instance, the torque calculation can be represented as follows.

$$Q\% = \frac{K}{N1REF\%} GPD_{avg}^m$$

Here, where N1REF is the power turbine speed governing reference and K is the torque scaling factor. The calculator 112 also can compute the shaft horse power (SHP) and can also optionally correct the SHP with at least one correction factor such as ambient temperature, altitude, etc.

The GPD anticipation operation 106 can also include a gas generator speed (Ng) synthesis operation 114. The calculated torque and/or SHP provided by the calculator 112 is used by the Ng synthesis operation 114 to determine the synthesized Ng value. The synthesis operation 114 can use altitude-dependent maps (e.g., lookup tables) for mechanical torque and speed, and can also optionally correct for other environmental conditions such as temperature effects, mass flow effects, engine to engine differences/trims, etc.

The control system 100 can further include cascaded outer loop and inner loop controllers. As shown in FIG. 1, an NPT governing loop controller 116 (e.g., an outer loop controller) uses an NPT reference 118 and regulates power turbine speed (NPT) while compensating for variations in power demand. As also shown in FIG. 1, the GPD anticipation operation 106 and the NPT governing loop 116 are integrated based on an aggregation of adjusted Ng request values provided by the NPT governing loop controller 116 and the synthesized Ng outputs provided by the GPD anticipation operation 106. Based on this aggregation, an Ng reference (Ng Request) is provided to an Ng governing loop controller 120 (e.g., an inner loop controller).

The Ng governing loop controller 120 provides fuel flow (WF) requests, based on the Ng request, to a gas turbine engine (GTE) 122 in advance of any NPT tracking errors, and can also react to changes in generator load in some embodiments. The GTE 122 provides torque to a generator and gear box 124. The Ng governing loop controller 120 also uses Ng measurements fed back to the Ng governing loop controller 120 from the GTE 122, as well as current Ng requests received using the NPT governing loop controller 116, to perform an adjustment 121 that uses the Ng provided as feedback and the Ng requests to adjust the fuel flow based on changes in power demand. In this way, the Ng governing loop controller 120 can directly control the fuel flow and the gas generator speed Ng. This inner loop acts as an actuator for power turbine speed governing. As also shown in FIG. 1, an output NPT 126 is achieved using the control system 100. As part of the outer loop, this output NPT can be provided as feedback so that the NPT governing loop controller 116 can perform an NPT adjustment 127 using the feedback NPT values and the NPT reference 118. The adjustment 127 serves to maintain fluctuations in NPT within a desired range.

As also shown in FIG. 1, the control system 100 can also include a programmable delay unit 128. The programmable delay unit 128 implements a delay in transmitting the smoothed GPD signal to the generator 124, to further improve NPT tracking. For example, the programmable delay can be managed with different numerical values, formulae, or look-up tables, and can be switched based on the negative or positive sign of the rate of change of the smoothed GPD. The delay can thus be controlled based on acceleration or deceleration rate to optimizing the delay using different values for acceleration or deceleration. In some cases, the delay can be greater for acceleration. The GTE 122 can accelerate faster than decelerate by hitting the Ng rate of change and WF rate of change limits. As such, the delays provided by the programmable delay unit 128 are designed to optimize the tracking performance and minimize speed fluctuations during transitions in power demand.

Although FIG. 1 illustrates one example control system 100 including an Ng governing inner loop, various changes may be made to FIG. 1. For example, while the control system of FIG. 1 uses an Ng governing inner loop, the control systems and various control loop structures of this disclosure can use different parameters for governing operation of the aircraft.

Figure 2:
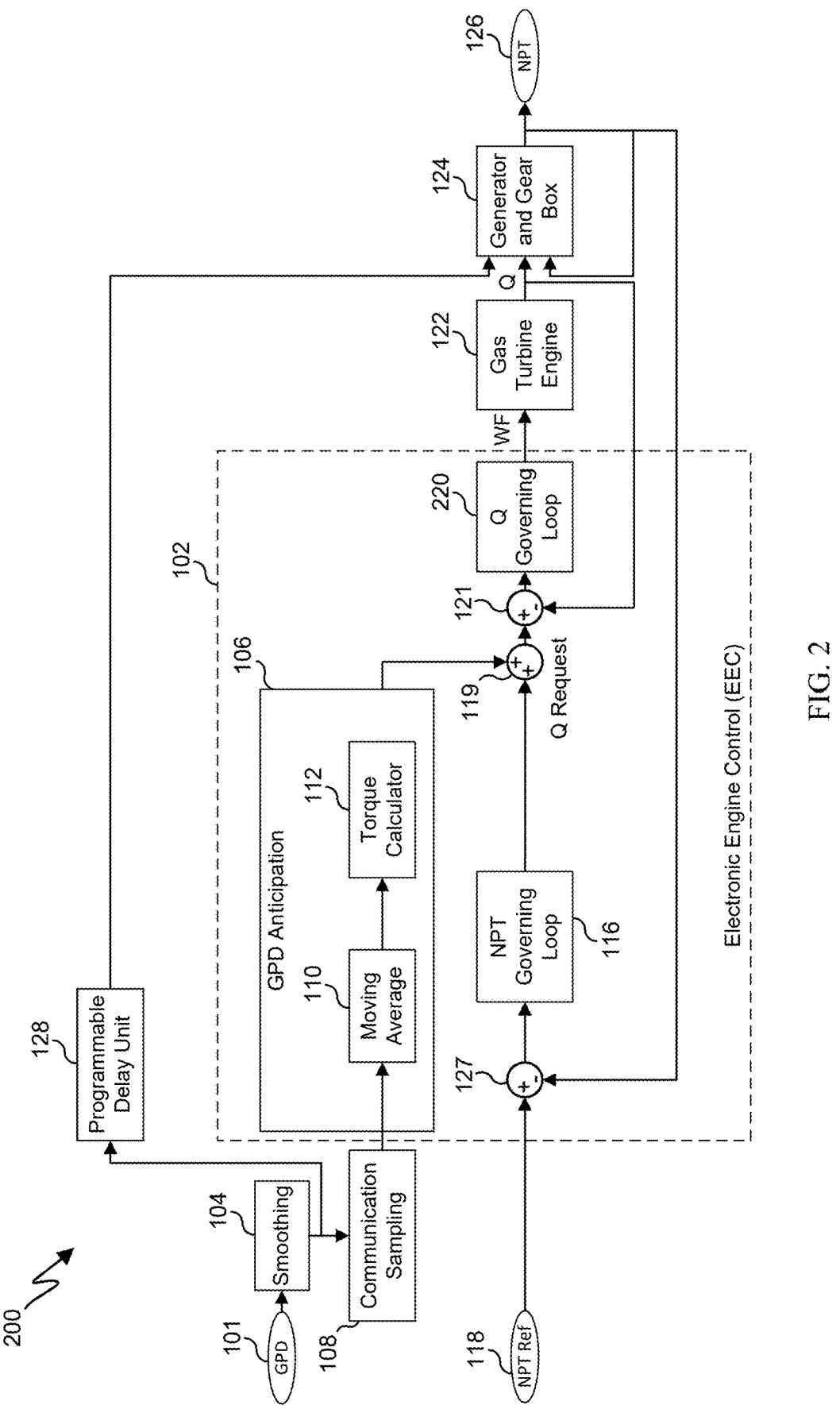
FIG. 2 illustrates an example control system including a torque governing inner loop in accordance with this disclosure.

For instance, FIG. 2 illustrates an example control system 200 including a torque governing inner loop in accordance with this disclosure. In various embodiments, the control loop structures shown in FIG. 2 can be implemented in the EEC 102.

As shown in FIG. 2, various elements function similarly to FIG. 1, with some key differences. For example, as shown in FIG. 2, in various embodiments, the GPD anticipation operation 106 may not include a synthesis operation, but instead the GPD anticipation operation 106 uses the torque calculator 112 to output a computed torque. The computed torque from the GPD anticipation operation 106 is then directly used with a torque governing inner loop controller 220 (e.g., the inner loop controller). As shown in FIG. 2, NPT outputs from the NPT governing loop 116 and anticipated torque outputs from the GPD anticipation operation 106 are used to generated torque requests (Q Request) to the torque governing loop 220. The torque governing loop 220 outputs fuel flow (WF) requests based on the adjustment 121 using the torque requests and torque measurements feedback provided by the GTE 122.

Although FIG. 2 illustrates one example control system 200 including a torque governing inner loop, various changes may be made to FIG. 2. For example, while the control system of FIG. 2 uses a torque governing inner loop, the control systems and various control loop structures of this disclosure can use yet other parameters for governing operation of the aircraft.

Figure 3:
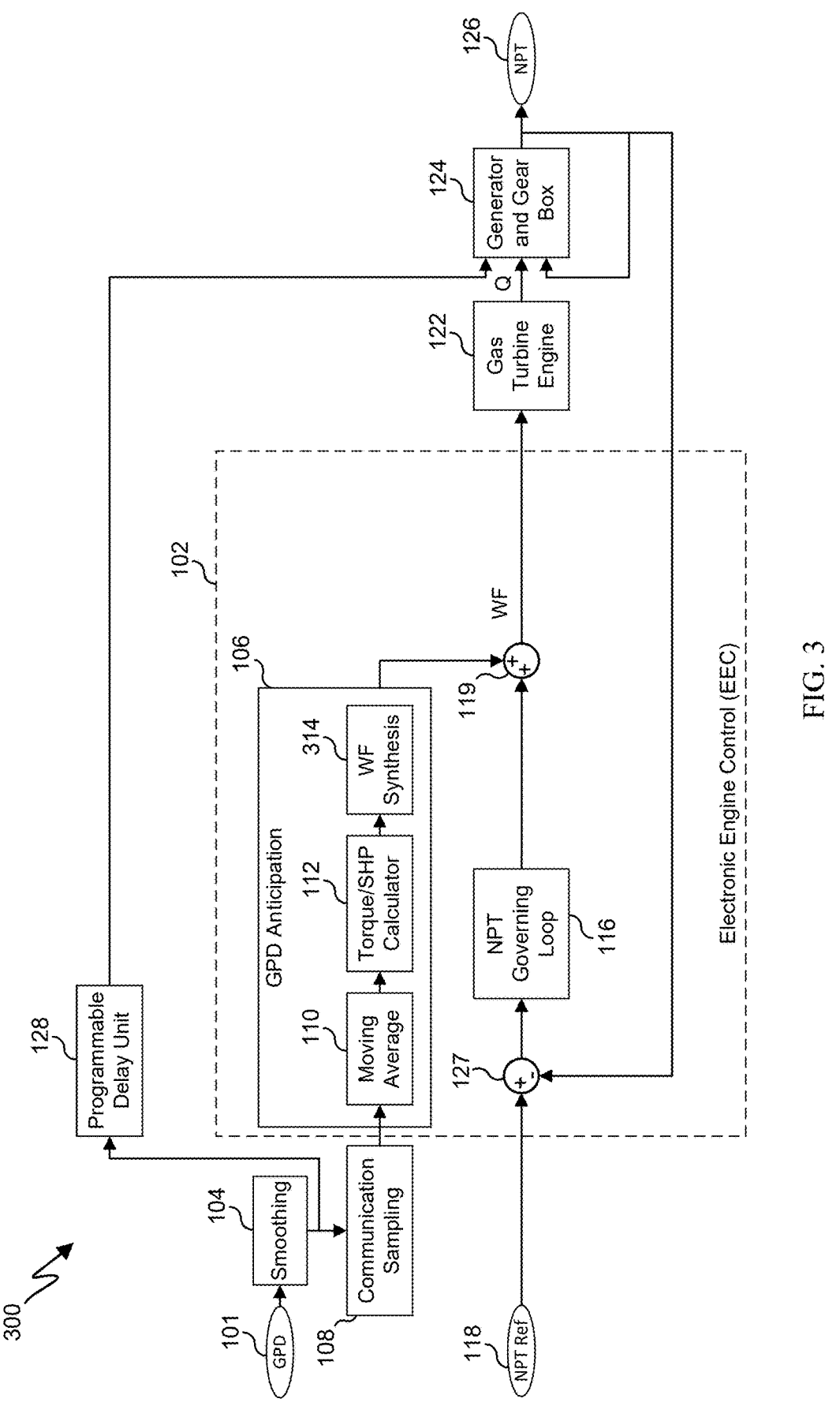
FIG. 3 illustrates an example control system using direct fuel flow control in accordance with this disclosure.

For instance, FIG. 3 illustrates an example control system 300 using direct fuel flow control in accordance with this disclosure. In various embodiments, the control loop structures shown in FIG. 3 can be implemented in the EEC 102.

As shown in FIG. 3, various elements function similarly to FIGS. 1 and 2, with some key differences. For example, as shown in FIG. 3, in various embodiments, the GPD anticipation operation 106, instead of using the Ng synthesis operation 114, uses a fuel flow (WF) synthesis operation 314. Thus, as shown in FIG. 3, in some embodiments, the control system structure can use fuel flow control directly (i.e., based on torque demand or SHP (determined using torque/SHP calculator 112) to fuel flow synthesis (determined using WF synthesis operation 314)) without any inner loop. The synthesized fuel flow output by the WF synthesis operation 314 is aggregated with NPT outputs provided by the NPT governing loop 116, and fuel flow requests are provided directly to the gas turbine engine without using an inner loop in the control system 300. Thus, the control system 300 controls Although FIG. 3 illustrates one example control system 300 using direct fuel flow control, various changes may be made to FIG. 3. For example, while the control system of FIG. 3 uses direct fuel control and avoids using an inner control loop, as described in this disclosure, the control systems and various control loop structures of this disclosure can use various other parameters for governing operation of the aircraft.

Figure 4B:
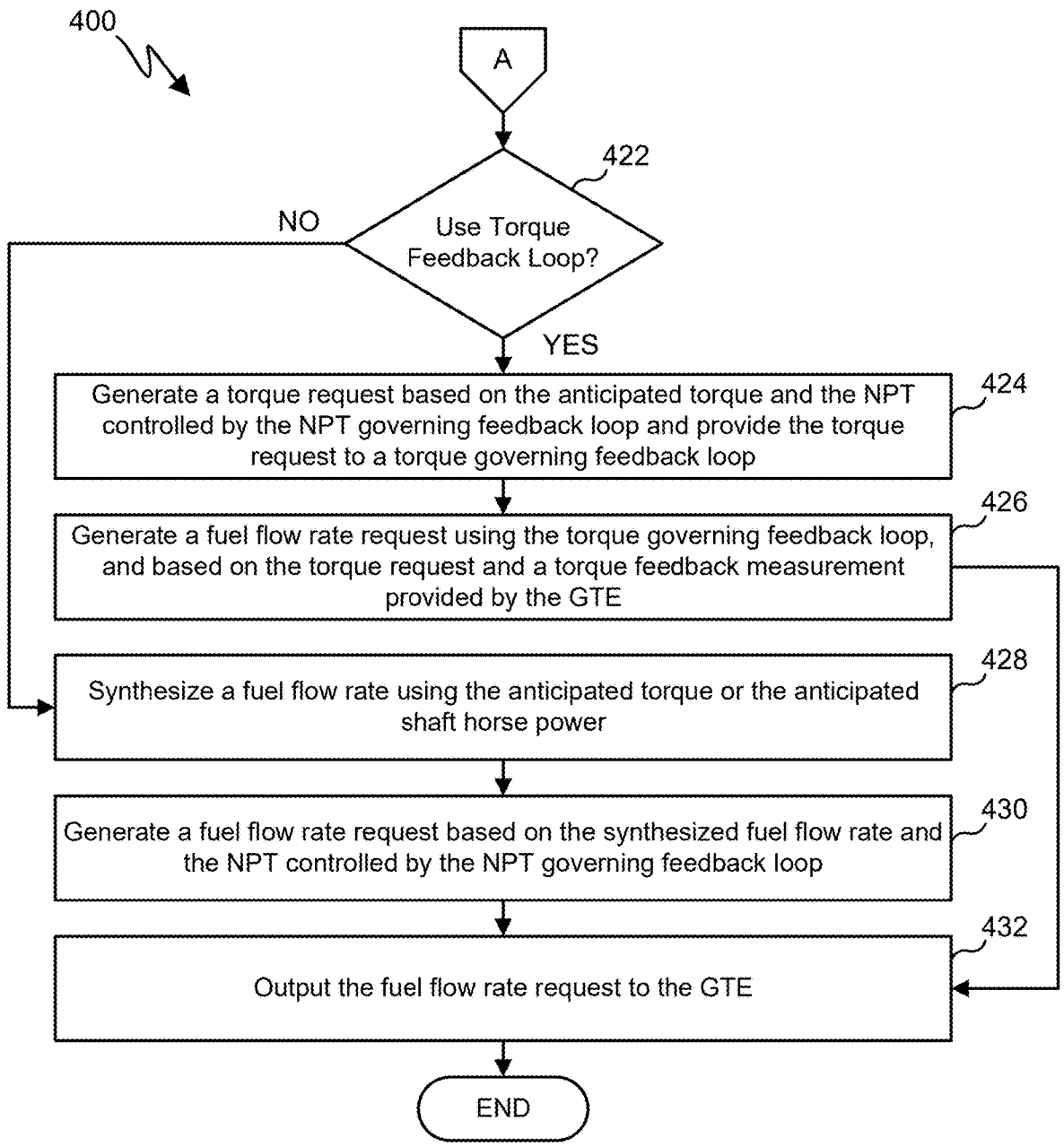

FIGS. 4A and 4B illustrate an example method 400 for powering a generator with a gas turbine engine and maintaining speed governing tolerance in accordance with this disclosure. As described below, the method 400 may be performed using any of control systems 100, 200, or 300 of FIG. 1, 2, or 3. For ease of explanation, the method 400 shown in FIGS. 4A and 4B may be described as being implemented or supported using a controller or processor. For example, method 400 may be implemented in or supported by the EEC 102 of this disclosure. However, the method 400 shown in FIGS. 4A and 4B may be implemented or supported by any suitable device(s) and in any suitable system(s).

As shown in FIGS. 4A and 4B, at step 402, a GPD signal, such as the GPD signal 101, is received for a gas generator of a GTE. At step 404, a smoothing filter is applied to the GPD signal to create a smoothed GPD signal, such as by applying the smoothing operation 104. As described in this disclosure, in some embodiments, applying the smoothing filter also applies a rate limiter to the GPD signal. As also described in this disclosure, in some embodiments, the smoothed GPD signal can be transmitted to a gas generator according to a delay using a programmable delay unit, such as based on a rate of change of the smoothed GPD signal. In some embodiments, the smoothed GPD signal can be transmitted to the gas generator by controlling the delay based on an acceleration rate or a deceleration rate of the GPD.

At step 406, the smoothed GPD signal is provided to a GPD anticipation operation, such as the GPD anticipation operation 106, to determine a GDP anticipation parameter for controlling fuel flow rate to the GTE. As described in this disclosure, using the smoothed GPD signal, a GPD anticipation parameter for controlling fuel flow rate to the GTE can be determined in various manners. At step 408, as part of determining the GDP anticipation parameter, a moving average of the smoothed GPD signal, e.g., the moving average 110, is determined. At step 410, an anticipated torque or an anticipated shaft horse power is calculating using the moving average.

At step 412, it is determined whether to use an Ng feedback loop in the control system, such as described with respect to FIG. 1. If so, at step 414, to determine the GPD anticipation parameter, a gas generator speed is synthesized using the anticipated torque or the anticipated shaft horse power. At step 416, a gas generator speed request is generated based on the synthesized gas generator speed and the NPT controlled by the NPT governing feedback loop and the gas generator speed request is provided to a gas generator speed governing feedback loop. As described in this disclosure, the gas generator speed governing feedback loop can be disposed as an inner control loop within the NPT governing feedback loop. At step 418, a fuel flow rate request is generated using the gas generator speed governing feedback loop, and based on the gas generator speed request and a gas generator speed feedback measurement provided by the GTE. At step 420, the fuel flow rate request is output to the GTE. It will be understood that the aircraft may be operated according to fuel flow rate request, as well as other parameters such as torque, speed, etc. The method 400 may then end, or, in some embodiments, may repeat from step 402 to receive another GPD signal to further and continuously operate during operation of an aircraft.

If, at step 412, it is determined not to use the Ng feedback loop, the method 400 moves to step 422. At step 422, it is determined whether to use a torque loop in the control system, such as described with respect to FIG. 2. If so, at block 424, a torque request is generated based on the anticipated torque calculated at step 410 and the NPT controlled by the NPT governing feedback loop and the torque request is provided to a torque governing feedback loop. As described in this disclosure, the torque governing feedback loop can be disposed as an inner control loop within the NPT governing feedback loop. At step 426, a fuel flow rate request is generated using the torque governing feedback loop, and based on the torque request and a torque feedback measurement provided by the GTE. The method 400 then moves to step 432. At step 432, the fuel flow rate request is output to the GTE. It will be understood that the aircraft may be operated according to fuel flow rate request, as well as other parameters such as torque, speed, etc. The method 400 may then end, or, in some embodiments, may repeat from step 402 to receive another GPD signal to further and continuously operate during operation of an aircraft.

If, at step 422, it is determined not to use the torque loop, the method 400 moves from step 422 to step 428. At step 428 to determine the GPD anticipation parameter, a fuel flow rate is synthesized using the anticipated torque or the anticipated shaft horse power. At step 430, a fuel flow rate request is generated based on the synthesized fuel flow rate and the NPT controlled by the NPT governing feedback loop. The method 400 then moves to step 432 to output the fuel flow rate request to the GTE. It will be understood that the aircraft may be operated according to fuel flow rate request, as well as other parameters such as torque, speed, etc. The method 400 may then end, or, in some embodiments, may repeat from step 402 to receive another GPD signal to further and continuously operate during operation of an aircraft.

Although FIGS. 4A and 4B illustrates one example of a method 400 for powering a generator with a gas turbine engine and maintaining speed governing tolerance, various changes may be made to FIGS. 4A and 4B. For example, while shown as a series of steps, various steps in FIGS. 4A and 4B could overlap, occur in parallel, occur in a different order, occur any number of times, be omitted, or be replaced by other steps. For example, it will be understood that, while in some embodiments steps 412 and 422 could be part of the method 400 to allow for a selection of which control methods of this disclosure to use, it will also be understood that, in various embodiments, just one of the three control methods described with respect to 400 could be implemented in the control system, based on the desired configuration.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a generator power demand (GPD) signal for a gas generator of a gas turbine engine (GTE);
applying a smoothing filter to the GPD signal to create a smoothed GPD signal;
determining, using the smoothed GPD signal, a GPD anticipation parameter for controlling fuel flow rate to the GTE; and
outputting a fuel flow rate request to the GTE based on the GPD anticipation parameter and a power turbine speed (NPT) controlled by an NPT governing feedback loop.

2. The method of claim 1, further comprising transmitting the smoothed GPD signal to a generator according to a delay based on a rate of change of the smoothed GPD signal.

3. The method of claim 1, wherein applying the smoothing filter also applies a rate limiter to the GPD signal.

4. The method of claim 1, wherein determining the GPD anticipation parameter includes:
determining a moving average of the smoothed GPD signal; and
calculating an anticipated torque or an anticipated shaft horse power using the moving average.

5. The method of claim 4, wherein determining the GPD anticipation parameter further includes synthesizing a gas generator speed using the anticipated torque or the anticipated shaft horse power, the method further comprising:
generating a gas generator speed request based on the synthesized gas generator speed and the NPT controlled by the NPT governing feedback loop;
providing the gas generator speed request to a gas generator speed governing feedback loop, wherein the gas generator speed governing feedback loop is disposed as an inner control loop within the NPT governing feedback loop; and
generating the fuel flow rate request using the gas generator speed governing feedback loop, and based on the gas generator speed request and a gas generator speed feedback measurement provided by the GTE.

6. The method of claim 4, further comprising:
generating a torque request based on the anticipated torque and the NPT controlled by the NPT governing feedback loop;
providing the torque request to a torque governing feedback loop, wherein the torque governing feedback loop is disposed as an inner control loop within the NPT governing feedback loop; and
generating the fuel flow rate request using the torque governing feedback loop, and based on the torque request and a torque feedback measurement provided by the GTE.

7. The method of claim 4, wherein determining the GPD anticipation parameter further includes synthesizing the fuel flow rate using the anticipated torque or the anticipated shaft horse power, the method further comprising:
generating the fuel flow rate request based on the synthesized fuel flow rate and the NPT controlled by the NPT governing feedback loop.

8. A system comprising:
at least one controller configured to:
receive a generator power demand (GPD) signal for a gas generator of a gas turbine engine (GTE);
apply a smoothing filter to the GPD signal to create a smoothed GPD signal;
determine, using the smoothed GPD signal, a GPD anticipation parameter for controlling fuel flow rate to the GTE; and
output a fuel flow rate request to the GTE based on the GPD anticipation parameter and a power turbine speed (NPT) controlled by an NPT governing feedback loop.

9. The system of claim 8, wherein the at least one controller is further configured to transmit the smoothed GPD signal to a generator according to a delay based on a rate of change of the smoothed GPD signal.

10. The system of claim 8, wherein applying the smoothing filter also applies a rate limiter to the GPD signal.

11. The system of claim 8, wherein, to determine the GPD anticipation parameter, the at least one controller is further configured to:
determine a moving average of the smoothed GPD signal; and
calculate an anticipated torque or an anticipated shaft horse power using the moving average.

12. The system of claim 11, wherein, to determine the GPD anticipation parameter, the at least one controller is further configured to synthesize a gas generator speed using the anticipated torque or the anticipated shaft horse power, and
wherein the at least one controller is further configured to:
generate a gas generator speed request based on the synthesized gas generator speed and the NPT controlled by the NPT governing feedback loop;
provide the gas generator speed request to a gas generator speed governing feedback loop, wherein the gas generator speed governing feedback loop is disposed as an inner control loop within the NPT governing feedback loop; and
generate the fuel flow rate request using the gas generator speed governing feedback loop, and based on the gas generator speed request and a gas generator speed feedback measurement provided by the GTE.

13. The system of claim 11, wherein the at least one controller is further configured to:
generate a torque request based on the anticipated torque and the NPT controlled by the NPT governing feedback loop;

provide the torque request to a torque governing feedback loop, wherein the torque governing feedback loop is disposed as an inner control loop within the NPT governing feedback loop; and generate the fuel flow rate request using the torque governing feedback loop, and based on the torque request and a torque feedback measurement provided by the GTE.

14. The system of claim 11, wherein, to determine the GPD anticipation parameter, the at least one controller is further configured to synthesize the fuel flow rate using the anticipated torque or the anticipated shaft horse power, and wherein the at least one controller is further configured to generate the fuel flow rate request based on the synthesized fuel flow rate and the NPT controlled by the NPT governing feedback loop.

15. A non-transitory machine readable medium including instructions that when executed cause at least one processor to:

receive a generator power demand (GPD) signal for a gas generator of a gas turbine engine (GTE);

apply a smoothing filter to the GPD signal to create a smoothed GPD signal;

determine, using the smoothed GPD signal, a GPD anticipation parameter for controlling fuel flow rate to the GTE; and output a fuel flow rate request to the GTE based on the GPD anticipation parameter and a power turbine speed (NPT) controlled by an NPT governing feedback loop.

16. The non-transitory machine readable medium of claim 15, further comprising instructions that when executed cause the at least one processor to transmit the smoothed GPD signal to a generator according to a delay based on a rate of change of the smoothed GPD signal.

17. The non-transitory machine readable medium of claim 15, wherein, to determine the GPD anticipation parameter, the non-transitory machine readable medium further comprises instructions that when executed cause the at least one processor to:

determine a moving average of the smoothed GPD signal; and calculate an anticipated torque or an anticipated shaft horse power using the moving average.

18. The non-transitory machine readable medium of claim 17, wherein, to determine the GPD anticipation parameter, the non-transitory machine readable medium further comprises instructions that when executed cause the at least one processor to synthesize a gas generator speed using the anticipated torque or the anticipated shaft horse power, and wherein the non-transitory machine readable medium further comprises instructions that when executed cause the at least one processor to:

generate a gas generator speed request based on the synthesized gas generator speed and the NPT controlled by the NPT governing feedback loop;

provide the gas generator speed request to a gas generator speed governing feedback loop, wherein the gas generator speed governing feedback loop is disposed as an inner control loop within the NPT governing feedback loop; and generate the fuel flow rate request using the gas generator speed governing feedback loop, and based on the gas generator speed request and a gas generator speed feedback measurement provided by the GTE.

19. The non-transitory machine readable medium of claim 17, wherein the non-transitory machine readable medium further comprises instructions that when executed cause the at least one processor to:

generate a torque request based on the anticipated torque and the NPT controlled by the NPT governing feedback loop;

provide the torque request to a torque governing feedback loop, wherein the torque governing feedback loop is disposed as an inner control loop within the NPT governing feedback loop; and generate the fuel flow rate request using the torque governing feedback loop, and based on the torque request and a torque feedback measurement provided by the GTE.

20. The non-transitory machine readable medium of claim 17, wherein, to determine the GPD anticipation parameter, the non-transitory machine readable medium further comprises instructions that when executed cause the at least one processor to synthesize the fuel flow rate using the anticipated torque or the anticipated shaft horse power, and wherein the non-transitory machine readable medium further comprises instructions that when executed cause the at least one processor to generate the fuel flow rate request based on the synthesized fuel flow rate and the NPT controlled by the NPT governing feedback loop.

* * * * *